(12) United States Patent
Patel et al.

(10) Patent No.: US 7,559,993 B1
(45) Date of Patent: Jul. 14, 2009

(54) PROCESS FOR DECOATING A WASHCOAT CATALYST SUBSTRATE

(75) Inventors: Nagesh Patel, Charlotte, NC (US); Hans-Ulrich Hartenstein, Charlotte, NC (US); Frank Wenz, Charlotte, NC (US)

(73) Assignee: SCR-Tech LLC, Charlotte, NC (US)

( * ) Notice: Subject to any disclaimer, the term of this patent is extended or adjusted under 35 U.S.C. 154(b) by 271 days.

(21) Appl. No.: 11/038,573

(22) Filed: Jan. 21, 2005

Related U.S. Application Data

(63) Continuation-in-part of application No. 10/452,903, filed on Jun. 3, 2003, now Pat. No. 6,929,701.

(51) Int. Cl.
*B08B 3/12* (2006.01)
*B01J 38/48* (2006.01)

(52) U.S. Cl. ............... 134/1; 134/28; 134/29; 502/22; 502/25; 502/27; 502/28; 502/56

(58) Field of Classification Search ............ 134/1, 134/26, 27, 28, 29, 30, 42; 502/22, 25, 27, 502/28, 20, 26, 29, 56
See application file for complete search history.

(56) References Cited

U.S. PATENT DOCUMENTS

| 4,210,628 A | 7/1980 | Ninomiya et al. |
| 4,548,911 A * | 10/1985 | D'Aniello et al. ............ 502/28 |
| 4,572,903 A | 2/1986 | Hino et al. |
| 4,729,975 A | 3/1988 | Kobayashi |
| 4,992,614 A | 2/1991 | Rodewald |
| 5,308,810 A | 5/1994 | Voss et al. |
| 5,689,798 A | 11/1997 | Oeste |
| 5,741,748 A | 4/1998 | Allen et al. |
| 5,817,701 A | 10/1998 | Leviness et al. |
| 5,844,005 A | 12/1998 | Bauman et al. |
| 5,877,107 A * | 3/1999 | Zahn et al. ............ 502/20 |
| 5,882,422 A | 3/1999 | Obayashi et al. |
| 6,025,292 A * | 2/2000 | Obayashi et al. ............ 502/27 |
| 6,232,254 B1 | 5/2001 | Schneider et al. |
| 6,241,826 B1 | 6/2001 | Dittmer et al. |
| 6,395,665 B2 * | 5/2002 | Nojima et al. ............ 502/25 |

FOREIGN PATENT DOCUMENTS

| DE | 38 16 600 A1 | 11/1989 |
| EP | 0 136 966 B1 | 1/1989 |
| EP | 0 353 467 A1 | 2/1990 |
| EP | 0 499 351 A1 | 8/1992 |
| EP | 0 824 973 A2 | 2/1998 |
| FR | 2.123.917 | 9/1972 |

\* cited by examiner

*Primary Examiner*—Michael Barr
*Assistant Examiner*—Saeed T Chaudhry
(74) *Attorney, Agent, or Firm*—Womble Carlyle

(57) ABSTRACT

The invention relates to a process for decoating a used washcoat carrier substrate to produce a clean, inert carrier or substrate. In a preferred embodiment, a process according to the invention includes treating a washcoat catalyst substrate in an aqueous solution including a dispersant, an emulsifier, and at least one of an acid and a base. Alternatively, the first solution may include sodium hydroxide, sodium bicarbonate, or aluminum bicarbonate. The substrate is also subject to ultrasonic treatment, while treating the substrate in an aqueous solution preferably including a dispersant. The substrate may ultimately be rinsed, for example in deionized water. During treatment, solutions may be agitated, for example by air injection, directed stream of water or other agitation. Optional embodiments include heating prior to immersion, the addition of a solvent to solution; rinsing between steps, for example with DI water; treatment with acid to remove sodium before final rinsing, final rinsing in a cascade system, and drying.

21 Claims, No Drawings

PROCESS FOR DECOATING A WASHCOAT CATALYST SUBSTRATE

CROSS-REFERENCE TO RELATED APPLICATIONS

This application is a continuation-in-part application of and claims priority to U.S. application Ser. No. 10/452,903, filed on Jun. 3, 2003 now U.S. Pat. No. 6,929,701. The disclosure of the above application is considered part of and is incorporated by reference in the disclosure of this application.

TECHNICAL FIELD

This invention relates to a process for decoating a substrate, and more particularly to decoating a used or worn washcoat catalyst by removing catalytic material from an inert carrier substrate.

BACKGROUND

Certain types of catalysts are utilized in industrial, commercial or consumer applications to reduce the emission of unburned hydrocarbons ("HC"), volatile organic compounds ("VOC"), and/or nitrogen compounds such as nitrous oxides. One such group of catalysts is generally known as washcoat catalysts, which may be utilized, for example, in automobile catalytic converters or for reducing nitrous oxide in emissions from gas-fired turbines. Typically, washcoat catalysts are formed of an inert substrate or carrier (the terms "substrate" and "carrier" being used interchangeably herein), which is coated with a catalytic material in an immersion process.

The inert substrates or carriers may be formed, for example, of suitable materials such as ceramic, zeolite, or metal. Particularly useful substrates include a ceramic or zeolite materials formed into shaped blocks having through-holes of selected design. This type of substrate is commonly referred to as a "honeycomb." Other useful substrates are metallic substrates formed as a layered or corrugated structure. Typically, the inert substrates are coated with a combination of catalytic materials, as well as a glue or binder that may be used to facilitate the application and retention of the catalytic materials on the substrate. In such instances, silica-based or acrylate glues binders are common.

In use, washcoat catalysts tend to lose their effectiveness over time. This degeneration can be due to one or more factors, including clogging, poisoning by metals such as sodium, other types of catalytic poisoning, or the reaction of catalytic materials with other substances found in emissions. In the past, degenerated washcoat catalysts were typically discarded, including the underlying inert substrate.

SUMMARY

The invention relates to a process for decoating a used washcoat carrier substrate, i.e., removing the catalytic material (and other materials such as compounds deposited by exhaust gas) from the substrate. This results in a substantially clean, inert carrier or substrate, which can be recoated, for example with new catalytic material, in a separate process.

In a preferred embodiment, a process according to the invention includes treating a washcoat catalyst substrate in an aqueous solution including an emulsifier, for example at a concentration of 0.5 to 5.0 percent by weight and maintained at a temperature of 10° to 90° C., while agitating the solution; treating the substrate in an aqueous solution preferably including a dispersant at a concentration of 0.5 to 5.0 percent by weight and maintained at a temperature of 10° to 90° C., while subjecting the substrate to an ultrasonic treatment; and rinsing the substrate, for example in water or deionized ("DI") water. During treatment with the emulsifier, the solution can be agitated, for example by air injection. Likewise, during the ultrasonic treatment the solution can be agitated mechanically. Optional embodiments include treatment with an acid or alkali following treatment with the emulsifier solution; rinsing between steps, for example with DI water; additional treatment with acid to remove sodium; final rinsing, for example in a cascade system; and drying.

The details of one or more embodiments of the invention are set forth in the accompanying drawings and the description below. Other features, objects, and advantages of the invention will be apparent from the description and drawings, and from the claims.

DETAILED DESCRIPTION

The invention relates to a multistep process for removing catalytic material and contaminants from a used washcoat catalyst carrier or substrate (referred to herein as a "substrate"). The result is the removal of substantially all such catalytic material, contaminants foreign materials and the like (collectively referred to herein as "catalytic material") from the substrate, allowing the inert substrate to be recycled by re-coating in a separate process. The invention generally requires treating the substrate with a solution including an emulsifier, for example by immersion, while agitating the solution. Following treatment with the emulsifier, the substrate can be treated in an acid or alkaline solution, for example by immersion, while agitating the solution. The substrate can then be rinsed if desired, to remove constituents present during previous treatment, before being subjected to an ultrasonic treatment in a third solution. The third solution can include a dispersant and/or other constituents. The substrate is subsequently rinsed and then preferably dried in an oven. Additional preferred embodiments are described with respect to each step.

In the preferred embodiment described herein, the substrate is treated in a first aqueous solution including an emulsifier, for example at a concentration of 0.5 to 5.0 percent by weight, and preferably about 1.0 to 2.0 percent by weight. The solution is maintained at a temperature of 10° to 90° C., and preferably at a temperature of 55° to 60° C. In general, the treatment (as well as subsequent treatments described below) may proceed more efficiently at higher temperatures, for example between 55° and 90° C., but in an industrial setting, equipment such as PVC piping or the like may set an upward limit, for example 60° C., on the temperature of any solvent or solution used.

In a preferred embodiment, treatment in this initial aqueous solution proceeds for approximately one hour, but any suitable time period may be used. The solution can be agitated, preferably through air injection, which may be uniformly distributed and injected underneath the substrate. Other forms of agitation can be employed, such as pumps, mechanical stirring, or by movement of the substrate within the aqueous solution. These latter forms of agitation are generally referred to herein as "mechanical agitation" of the solution.

The emulsifier is preferably a polyester-based and/or ethoxylated emulsifier. The emulsifier may further have a hydrophile-liophile balance ("HLB") value preferably ranging from 2 to 19, and/or a polyethyleneglycol range of 300 to 1500. In many instances, the substrate may include, as part of the washcoat catalyst coating, silicon or acrylate glues or binders. In these cases, it is particularly useful to select an emulsifier which advantageously dissolves and suspends these silica or acrylate substances. One such preferred emulsifier is sold under the trade name EGANAL UNI by Clariant Corporation (Charlotte, N.C.).

This first solution can also include a surfactant such as an anionic or nonionic surfactant, for example at a concentration of 0.5 to 5.0 percent by weight, as well as one or more solvents, for example at a concentration of about 1.0 to 3.0 by weight. Where utilized, preferred solvents include propyleneglycolalkylether and methylethylketone, which can be used individually or as a mixture, or as a mixture with other solvents.

Following the treatment with emulsifier, an acid or alkali can advantageously be added to the solution to create a second solution. The second solution preferably includes the materials described above as well as the acid or alkali at a concentration of 0.4 to 5.0 percent by weight. This second solution can also be agitated through air injection or mechanically, and may be maintained at the temperatures described above. In a preferred embodiment, treatment with the second solution proceeds for approximately one hour, but any suitable time period can be used.

Preferred alkalis include NaOH, KOH, $Na_2CO_3$ and triethanolamine. If NaOH is used, it can be added as a 50 percent solution to obtain the desired concentration. Preferred acids include nitric acid, acetic acid, ascorbic acid or $H_2SO_4$. If desired, this second solution can be formed separately from the first solution, rather than adding alkali to the first solution.

For large scale production where an alkali is utilized to form the second solution as described above, an additional alkali-stable emulsifier can be added (again, either added into the first solution to form the second solution, or formed separately). In this case, the second solution preferably includes the alkali-stable emulsifier and/or dispersant at a concentration of 0.4 to 1.0 percent by weight. The alkali-stable emulsifier may allow re-use of the entire solution for the first and/or second steps described herein, and in some cases even a third or subsequent use of the solution, thereby increasing the efficiency of the process and reducing waste.

In this embodiment, the alkali and alkali-stable emulsifier can be used in effective concentrations. For example, if significant crosslink bonds have been formed between the silicon or acrylate glue and the substrate, then the alkali is preferably used at a concentration of 0.5 to 5.0 percent by weight, and the alkali-stable emulsifier and/or dispersant (if present) is preferably used at a concentration of 0.5 to 5.0 percent by weight. Alternatively, if significant crosslink bonds have not been formed, then the alkali and alkali-stable emulsifier and/or dispersant can be used at lower concentrations, for example 0.4 to 1.8 percent alkali by weight and 0.4 to 1.8 percent alkali-stable emulsifier and/or dispersant by weight. Lower concentrations may also be useful, and in some cases this treatment with alkali and/or alkali-stable emulsifier can be omitted altogether.

Similarly, where an acid is utilized as described above to form the second solution, an additional acid-stable emulsifier can be added (again, either added into the first solution to form the second solution, or formed separately). In this case, the second solution preferably includes the acid-stable emulsifier and/or dispersant at a concentration of 0.4 to 1.0 percent by weight. The acid-stable emulsifier may allow re-use of the entire solution for the first and/or second steps described herein, and in some cases even a third or subsequent use of the solution, thereby increasing the efficiency of the process and reducing waste.

In this embodiment, the acid and acid-stable emulsifier can be used in effective concentrations. For example, if significant crosslink bonds have been formed between the silicon or acrylate glue and the substrate, then the acid is preferably used at a concentration of 0.5 to 5.0 percent by weight, and the acid-stable emulsifier and/or dispersant (if present) is preferably used at a concentration of 0.5 to 5.0 percent by weight. Alternatively, if significant crosslink bonds have not been formed, then the acid and acid-stable emulsifier and/or dispersant can be used at lower concentrations, for example 0.4 to 1.8 percent acid by weight and 0.4 to 1.8 percent acid-stable emulsifier and/or dispersant by weight. Lower concentrations may also be useful, and in some cases this treatment with acid and/or acid-stable emulsifier can be omitted altogether.

Following treatment in the first and/or second solutions, the substrate may advantageously be rinsed in or with water maintained at a temperature of 10° to 90° C., and preferably at 50° to 70° C. This rinsing can be performed either by immersion, with agitation of the solution, or by spraying the substrate with water. If air agitation is employed as the method of agitation, the water may preferably be maintained at a temperature of 40° to 55° C. During this rinsing step, the pH of the water can be adjusted to 5 to 7, for example by the addition of acid such as sulfuric acid.

The substrate can then be subject to an ultrasonic treatment. During this step, the substrate is preferably immersed in a third aqueous solution which can include a dispersant, for example at a concentration of 0.5 to 5.0 percent by weight, and preferably at a concentration of 1.0 to 2.0 percent by weight. The third aqueous solution can be maintained at a temperature of 10° to 90° C., and preferably at a temperature of 50° to 60° C. Ultrasonic treatment may preferably proceed for approximately one hour, but any suitable time period can be used.

The dispersant is advantageously an ethoxlyated dispersant, and can also include one or more sequestrants, solvents and/or detergents. Where significant sodium is present or has been introduced, materials with a tendency to chelate sodium ions are particularly preferred. One exemplary useful dispersant is sold under the trade name PENTAX GP by Clariant Corporation. During ultrasonic treatment, the aqueous solution can further include an emulsifier, for example a non-ionic emulsifier at a concentration of about 0.5 to 5.0 percent by weight. The non-ionic emulsifier can further include one or more additional sequestrants. It should be understood that many commercial brands of emulsifiers or dispersants include a blend of compounds that provide both functions. Moreover, some emulsifiers may act as effective dispersants over the relatively short time periods contemplated for each process step, and such materials can be considered "dispersants" for purposes of the invention.

If desired, the ultrasonic treatment can be performed in water only, without the addition of any dispersant, emulsifier or other material. Alternatively, the ultrasonic treatment can be performed while the substrate is immersed in the first or second aqueous solution described above, where the subsequent rinsing step has been omitted.

Following ultrasonic treatment, the substrate can advantageously be rinsed again in water maintained at a temperature of 10° to 90° C., and preferably at 55° to 60° C. This rinsing can be performed by immersion, with agitation of the solution if desired. If air injection is employed for agitation, the water may preferably be maintained at a temperature of 40° to 55° C.

Where significant sodium or other alkali ions are present or have been added, an additional alkali or sodium leaching step may be useful following the ultrasonic treatment and/or rinsing. Preferably this step is performed by treating the substrate in a fourth aqueous solution including an acid. The acid can be provided at a concentration of 0.5 to 5.0 percent by weight, and the fourth aqueous solution can be maintained at a temperature of 10° to 90° C., and preferably at 40° to 50° C. Exemplary acids include acetic acid, ascorbic acid or $H_2SO_4$ which are preferably included at a concentration of 0.5 to 5.0 percent by weight. During the alkali or sodium leeching step, the aqueous solution can be agitated, for example by air injection or mechanically. Sodium leaching preferably lasts for approximately 20 to 40 minutes, but any suitable time period can be used.

Once the final treatment has been performed (where the "final treatment" can be, for example the sodium leaching step or the ultrasonic treatment), the substrate can advantageously be rinsed in water maintained at a temperature of 10° to 90° C. Preferably this rinsing is performed by cascade washing, with water preferably maintained at a temperature of 40° to 60° C.

In a preferred embodiment, cascade washing occurs in a unit having a plurality of chambers, for example four chambers. Water flows continuously from a first chamber, where it is introduced, through subsequent chambers individually until it exits a last chamber. The substrate is first introduced to the last chamber, and then is periodically moved from chamber to chamber in the opposite direction of water flow, until it is finally immersed in the first chamber. The substrate is preferably rinsed in each chamber for approximately 30 minutes, but any suitable time period can be employed for each chamber. The conductivity of the water exiting the first chamber can be monitored, and is advantageously not greater than about 5 micro-siemens (µs) when the substrate is removed from the first chamber. The water in each chamber can be agitated as desired.

Following rinsing, the substrate can be dried. Drying is preferably performed in a three-stage oven maintained at a temperature of 100° to 205° C., or alternatively an oven maintained at a temperature of 25° to 450° C. Air drying can optionally be used, if desired.

For each step, it is advantageous to use some form of deionized ("DI") water to form the aqueous solution. Except where otherwise noted, DI water is also preferably used during any rinsing step, in part because the DI water more effectively removes any remaining contaminants, catalysts, binders, solvents and the like. If DI water is not employed, some other form of demineralized, purified or filtered water may be advantageous, but unpurified or unfiltered water can also be used. It is understood that different types of water can be employed for each step, as desired.

In some circumstances, additional forms of the invention may be useful, for example where prior degeneration or poisoning of the catalytic blocks makes removal of the washcoat particularly difficult. In such circumstances (or where otherwise desired), additional or alternative process steps and features may be employed. The description below generally relates to these forms of the invention.

In one such exemplary alternative process, the substrate is treated in a first aqueous solution containing an acid or alkali, a dispersant, and an emulsifier. Preferably NaOH is used as the acid or alkali, in a concentration of 3 to 5 percent by weight. Other useful acids are alkalis are listed above, and other suitable concentrations may be employed.

Suitable dispersants include an ethoxylated dispersant, and can also include one or more sequestrants, solvents and/or detergents. Many dispersants include long chain molecules which assist in trapping and removing particles, and such dispersants may be particularly useful, including for example Anionic polymeric phosphate ester. The dispersant for example at a concentration of 0.5 to 5.0 percent by weight, and preferably at a concentration of 1.0 to 2.0 percent by weight.

The emulsifier is preferably a polyester-based and/or ethoxylated emulsifier. The emulsifier may further have a hydrophile-liophile balance ("HLB") value preferably ranging from 2 to 19, and/or a polyethyleneglycol range of 300 to 1500. As described above, in some cases it is particularly useful to select an emulsifier which advantageously dissolves and suspends silica or acrylate substances. One such preferred emulsifier is sold under the trade name EGANAL UNI by Clariant Corporation (Charlotte, N.C.).

This first solution can also include one or more solvents, for example at a concentration of about 1.0 to 3.0 by weight. In this embodiment, preferred solvents include DPM (dipropylenemethyl ether) and triethanol amine, which can be used individually, in a mixture, or in a mixture with other solvents.

The first solution is maintained at a temperature of 10° to 90° C., and preferably at a temperature of 75° to 85° C. While the substrate may be treated for any suitable period of time and in any suitable manner, preferably the substrate is soaked in the first solution for 2 to 8 hours. During this soaking time, the solution may be agitated mechanically (for example by moving the substrate within the solution) or by air injection.

In one form, following initial soaking as described above, the solution may further be agitated with a high pressure pump such as a diaphragm pump. The solution may be pumped through each substrate block for a period of time, such as 15 to 30 minutes, so that each substrate block is subject to the high pressure washing or rinsing of the pump. During this high pressure wash stage, the temperature of the first solution is preferably maintained between 70° and 75° C.

Following treatment in the first solution, the substrate may be rinsed in water. The water used for this step may be process (tap) water or a form of purified water as described above. While any suitable temperature may be used, the water may preferably be maintained between 60° and 80° C. The rinsing may be achieved by soaking, spraying or other suitable method. In a preferred form, water is immersed and subjected to a directed stream of water from a movable pipe or hose.

Following rinsing, the substrate may be subjected to an ultrasound treatment while immersed in a second solution. While any solution may be employed for the ultrasound treatment, the second solution is preferably of the type described in the first step (and in fact may be re-used or recycled from the first step, if desired). In particular, it may be the same solution as the first solution used (i.e., having the same constituents), or may be among the other types of "first solution" described above. During ultrasound treatment, the second solution is preferably maintained between 40° and 90° C., and in particular around 75-80° C. In this stage, the amount of second solution utilized is preferably minimized to just immerse the substrate. This arrangement helps to optimize the ultrasonic power applied to the substrate.

After ultrasound treatment, the substrate may again be rinsed as described above, for example using a high pressure, hot-water rinsing as described. This rinsing may utilize the same bath in which the ultrasound took place, or with water. In addition or alternatively, the substrate may be neutralized by rinsing with an alkaline or acidic solution, to neutralize any acid or alkali present. If an acidic solution is utilized, it is preferably provided at a pH of between 3 and 4, although any suitable pH is within the scope of the invention.

Following ultrasonic treatment and any rinsing, the substrate may be subjected to any of the sodium leeching, cascade washing, and drying steps as described above. Each of these steps may be utilized as necessary, in any desired combination.

Additional alternative process steps may also be useful in decoating difficult catalyst substrates or blocks. One such process steps involves heating the block before treatment with the first solution. It has been found that heating prior to immersion or other treatment may increase the effectiveness of the treatment. In a preferred form, the substrate is initially heated, for example in an oven, to approximately 300° to 400° F. (i.e., the oven is maintained at that temperature), and then immersed in a first solution (as described above in reference to the alternative embodiments) maintained between 120° and 160° C. Heating the substrate to between 340° and 380° F. before immersion is particularly preferred. Treatment within the first solution may take place as described above, and the substrate may be further processed as described above.

When this initial heating is utilized, an alternative first solution is an aqueous solution including NaOH at a concentration of between 5 and 10 percent by weight and an organic solvent such as N-Methyl Pyrrollidone at a concentration of between 3 and 10 by weight. This solution is preferably maintained at a temperature of between 60° and 80° C. This same alternative solution may be utilized during any ultrasound treatment as described above.

Another alternative first solution includes sodium bicarbonate at a concentration of three to ten percent by weight, and/or ammonium bicarbonate at a concentration of three to ten by weight. When utilized, this solution is preferably maintained at a temperature of between 25° and 40° C.

The invention is further described in the following examples, which should not be construed to limit the scope of the invention.

EXAMPLE 1

A used honeycomb catalyst (pitch of 3.0 mm and block size 15"×15"×30") designated type A was treated according to the invention. In order to remove decoating in the lab a small test block (approx. 8×8×8 cm) was used. Initial weight recorded was 126.7418 g. The test block was treated with 1.5% by weight solution made of emulsifier EGANAL UNI and CLEANER MCB. The solution was heated to 60° C. for 2 hours with mechanical agitation and followed by rinsing and applying ultrasonic treatment with 1.0% solution made of PENTEX GP for 30 minutes followed by rinsing and drying. Following treatment, it was found that the channels of the catalyst were cleaned with no residue on it. The final weight recorded was 115.0816 g. Approximately 9.2% weight was reduced, which is equivalent to a $\geqq$99% decoating efficiency.

EXAMPLE 2

Honeycomb catalyst designated type B (pitch of 3.0 mm and block size 15"×15"×30") were treated. This type is considered a strongly bonded and coated substrate.

In order to remove the washcoat coating a small test block (8×8×8 cm.) was treated. The block was treated with 1.5% by weight Clariant MCB and 1.5% by weight of 50% NaOH solution, with frequent mechanical agitation for 2 hours. The test block was visually inspected and compared with untreated block, the inspection revealing that two sides were fully decoated and two sides were approximately 50% decoated. The block was rinsed and subjected to ultrasonic treatment in the same initial solution for 20 minutes, followed by further ultrasonic treatment using fresh bath made of 1% PENTEX GP solution at 60° C. for 20 minutes. After washing and drying the block was observed visually, with the inspection revealing greater than 95% removal of the washcoat coating. These results were confirmed by measure the weight difference before and after decoating.

EXAMPLE 3

A substrate block designated type C, similar to type B, was used for further study and decoating. The substrate was first treated in aqueous solution having 1.5% EGANAL UNI at 60° C. with mechanical agitation and frequent airing for approximately one hour. Subsequently, 1.3% by weight of a 50% NaOH solution was added, and treatment continued with agitation at 60° C. for 1 hour. The substrate was subsequently rinsed, and ultrasonic treatment was applied in a solution having 1.5% by weight PENTEX GP for 30 minutes at 60° C. The block was rinsed and dried. Visual observation indicated substantially complete decoating, and weight loss measurements confirmed a 97% removal of the washcoat coating from the block.

EXAMPLE 4

A test block designated type D (8×8×15 cm., L×W×H) was treated with 2.0% by weight Eganal UNI and 2.0% by weight of 50% NaOH solution. The treatment was carried out at 70° C. for 2 hours with frequent mechanical agitation. The test block was washed applying jet stream pressure using process water maintained at approximately 60-70° C. The block was visually inspected and compared with untreated block. The inspection revealed approximately 90% removal of washcoat coating. The block was further subjected to ultrasonic treatment using 1% NaOH and 1.5% Pentex OS-NF at 70° C. for 40 minutes followed by warm water rinsing under jet pressure. After subsequent washing and neutralization of alkali by acetic acid, the block was rinsed with DI water and dried. The visual inspection revealed more than 98% removal of washcoat coating.

A number of embodiments of the invention have been described. Nevertheless, it will be understood that various modifications may be made without departing from the spirit and scope of the invention. For example, while the invention has been described as a series of steps in a particular order, it may be useful to vary the order of steps in particular circumstances, or omit certain steps despite the fact that certain solutions may be designated in the description or claims as "first," "fourth," or the like. Such numerical and step-wise designations are provided purely for clarity of description, and should not be construed as a limitation on the invention. Similarly, while many steps have been described as requiring immersion of the substrate in a solution, the substrate could alternatively be sprayed with the respective solution rather than immersed in it. Moreover, any type of agitation can be used. Where agitation and in particular air agitation is used, defoamers can be added to suppress foaming. Accordingly, other embodiments are within the scope of the following claims.

What is claimed is:

1. A method of removing catalytic material from a catalyst substrate, comprising:
    treating a substrate in a first aqueous solution maintained at a temperature of 10° to 90° C., the first aqueous solution comprising an emulsifier having a hydrophile-lipophile value of from 2 to 19, and at least one of an acid and a base; and treating the substrate in a second aqueous solution maintained at a temperature of 10° to 90° C., while subjecting the substrate to an ultrasonic treatment.

2. The method according to claim 1, wherein the first aqueous solution further includes a solvent.

3. The method according to claim 2, wherein the solvent includes at least one of dipropylenemethyl ether and triethanol amine.

4. The method according to claim 1, wherein the first aqueous solution includes NaOH.

5. The method according to claim 4, wherein the first aqueous solution includes NaOH at a concentration of 3 to 5 percent by weight.

6. The method according to claim 1, further comprising, following the treatment with the first aqueous solution:
applying agitation to the first aqueous solution so that a directed stream of the first aqueous solution is directed towards at least part of the substrate.

7. The method according to claim 1, wherein the second aqueous solution includes a dispersant, an emulsifier, and at least one of an acid and a base.

8. The method according to claim 7, wherein the first aqueous solution includes NaOH and the second aqueous solution includes NaOH.

9. The method according to claim 8, further comprising, following ultrasonic treatment:
treating the substrate in an aqueous solution comprising acid at a concentration of 0.5 to 5.0 percent by weight.

10. The method according to claim 8, further comprising, following ultrasonic treatment:
treating the substrate in an aqueous solution comprising a base at a concentration of 0.5 to 5.0 percent by weight.

11. The method according to claim 1, further comprising rinsing the substrate in a cascade washing system having a plurality of chambers, wherein water flows through the plurality of chambers from a first chamber to a last chamber, and wherein the substrate is moved periodically through the plurality of chambers from the last chamber to the first chamber.

12. The method of claim 1, wherein the emulsifier is a polyester-based emulsifier.

13. The method of claim 1, wherein the emulsifier is an ethoxylated emulsifier.

14. A method of removing catalytic material from a catalyst substrate, comprising:
heating the substrate to between 300° and 400° F.;
treating a substrate in a first aqueous solution maintained at a temperature of 10° to 90° C., wherein the first aqueous solution includes an emulsifier, and at least one of an acid and a base;
rinsing the substrate; and
treating the substrate in a second aqueous solution maintained at a temperature of 10° to 90° C., while subjecting the substrate to an ultrasonic treatment wherein the second aqueous solution includes a dispersant and at least one of an acid and a base.

15. The method according to claim 14, wherein the first aqueous solution includes NaOH at a concentration of 3 to 5 percent by weight.

16. The method according to claim 14, wherein the second aqueous solution includes NaOH at a concentration of 3 to 5 percent by weight.

17. The method according to claim 12, wherein the first aqueous solution includes NaOH at a concentration of 5 to 10 percent by weight and an organic solvent.

18. The method according to claim 17, wherein the first aqueous solution further includes a solvent.

19. The method according to claim 17, wherein the second aqueous solution includes NaOH at a concentration of 5 to 10 percent by weight and an organic solvent.

20. The method according to claim 12, wherein the first aqueous solution includes sodium bicarbonate at a concentration of 3 to 10 percent by weight.

21. The method according to claim 20, wherein the first aqueous solution includes ammonium bicarbonate at a concentration of 3 to 10 percent by weight.

* * * * *